US007298728B2

(12) United States Patent
Golla et al.

(10) Patent No.: US 7,298,728 B2
(45) Date of Patent: Nov. 20, 2007

(54) SCHEDULING SYSTEM AND METHOD FOR A BURST SWITCH

(75) Inventors: Prasad N. Golla, Plano, TX (US); John Blanton, Dallas, TX (US); Gerard Damm, Ottawa (CA); Dominique Verchere, Chauffailles (FR); Céline Haardt, Bouloc (FR); Farid Farahmand, Plano, TX (US)

(73) Assignee: Alcatel Lucent, Paris (FR)

( * ) Notice: Subject to any disclaimer, the term of this patent is extended or adjusted under 35 U.S.C. 154(b) by 1109 days.

(21) Appl. No.: 10/328,613

(22) Filed: Dec. 23, 2002

(65) Prior Publication Data

US 2004/0120276 A1 Jun. 24, 2004

(51) Int. Cl.
*H04B 7/212* (2006.01)
(52) U.S. Cl. ...................... 370/347; 370/337
(58) Field of Classification Search ............... 370/321, 370/337, 345, 336, 347, 349, 395.4, 395.42, 370/442, 473–474, 395.7–395.72, 412–418
See application file for complete search history.

(56) References Cited

U.S. PATENT DOCUMENTS

| 5,499,238 | A | | 3/1996 | Shon | |
|---|---|---|---|---|---|
| 5,838,681 | A | * | 11/1998 | Bonomi et al. | 370/395.41 |
| 6,052,751 | A | * | 4/2000 | Runaldue et al. | 710/107 |
| 6,260,090 | B1 | * | 7/2001 | Fuhs et al. | 710/107 |
| 6,269,077 | B1 | * | 7/2001 | Matsumura et al. | 370/218 |
| 6,529,503 | B1 | * | 3/2003 | Chiang et al. | 370/363 |
| 6,681,270 | B1 | * | 1/2004 | Agarwala et al. | 710/40 |
| 6,742,046 | B2 | * | 5/2004 | Yamamoto et al. | 709/240 |
| 7,114,026 | B1 | * | 9/2006 | Khanna | 711/108 |
| 2003/0026287 | A1 | * | 2/2003 | Mullendore et al. | 370/442 |

FOREIGN PATENT DOCUMENTS

| EP | 1 158 699 A2 | 11/2001 |
|---|---|---|
| EP | 1 168 664 A2 | 1/2002 |

OTHER PUBLICATIONS

McKeown, N.; Fast Switched Backplane for a Gigabit Switched Router: White Paper, pp. 1-25.
McKeown, et al.; A Quantitative Comparison of Iterative Scheduling Algtorithms for Input-Queued Switches; Computer Networks and ISDN Systems; 1998; pp. 2309-2326; vol. 30, No. 24.

(Continued)

*Primary Examiner*—Chi Pham
*Assistant Examiner*—Thai Hoang
(74) *Attorney, Agent, or Firm*—Danamraj & Emanuelson, P.C.; Jessica W. Smith

(57) ABSTRACT

A scheduling system and method operable with a burst switching element wherein control information is provided to the switching element via a separate Burst Header that precedes data bursts on ingress data channels. In one embodiment, a series of scheduling determinations are made in a select order such that packet treatment (i.e., processing for transmission, buffering, or packet dropping) is optimized with respect to packet loss and available buffer space. In another embodiment, control information received in the Burst Headers is utilized to reserve output data channel bandwidth to future incoming data packets in a forward-looking scheduling mechanism.

20 Claims, 12 Drawing Sheets

OTHER PUBLICATIONS

McKeown, N.; The ISLIP Scheduling Algorithm for Input-queued Switches; IEEE/ACM Transactions on Networking; Apr. 1999; vol. 7, No. 2; pp. 188-201.

McKeown, et al.; Achieving 100% Throughput in an input-Queued Switch; Proceedings IEEE INFOCOM '96; Fifteenth Annual Joint Conference of the IEEE Computer Societies; Networking the Next Generation: Mar. 1996; vol. 1, pp. 296-302.

Chao, et al.; Saturn: A Terabit Packet Switch Using Dual Round-Robin: IEEE Communications Magazine; Dec. 2000; pp. 78-84.

* cited by examiner

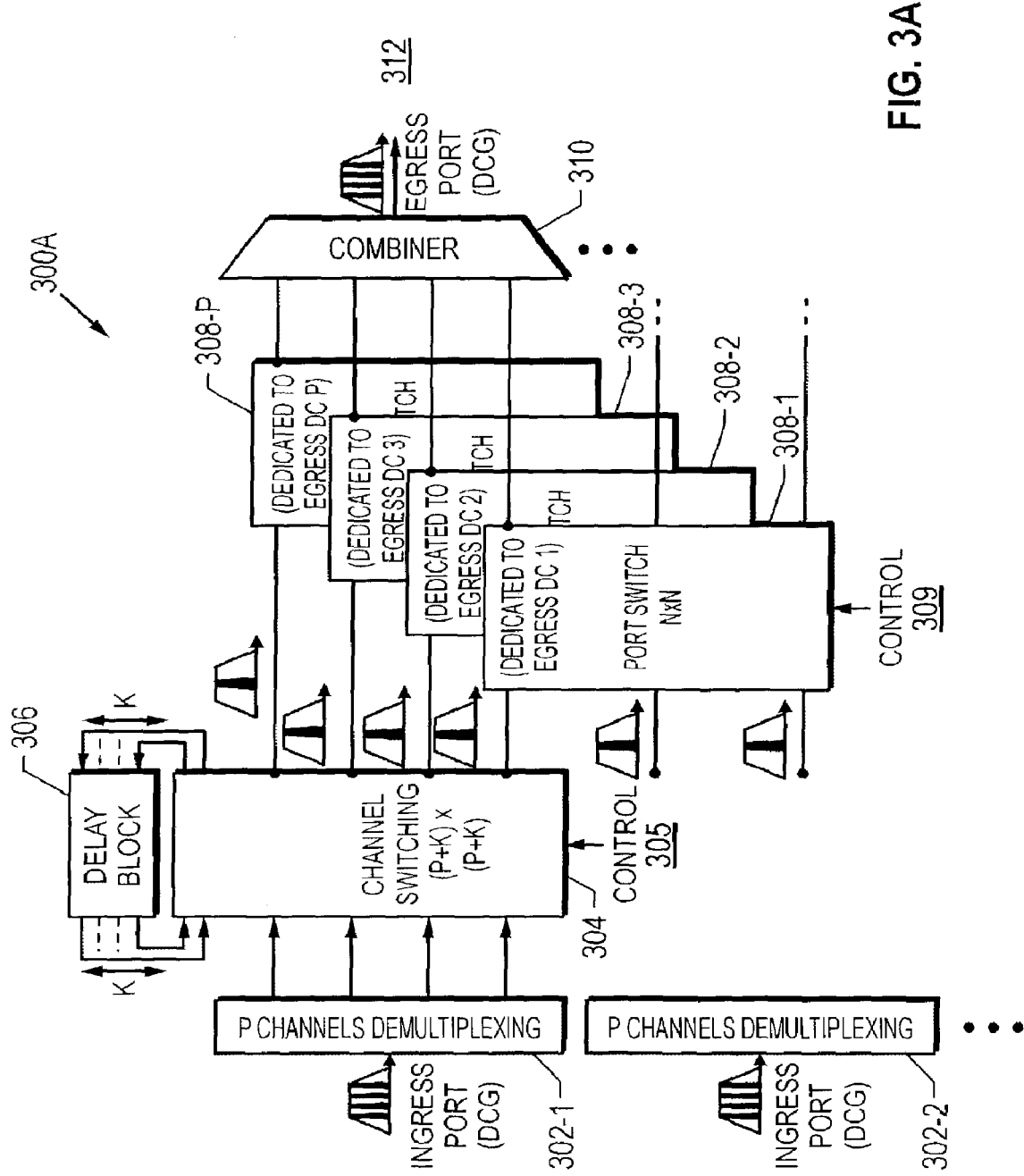

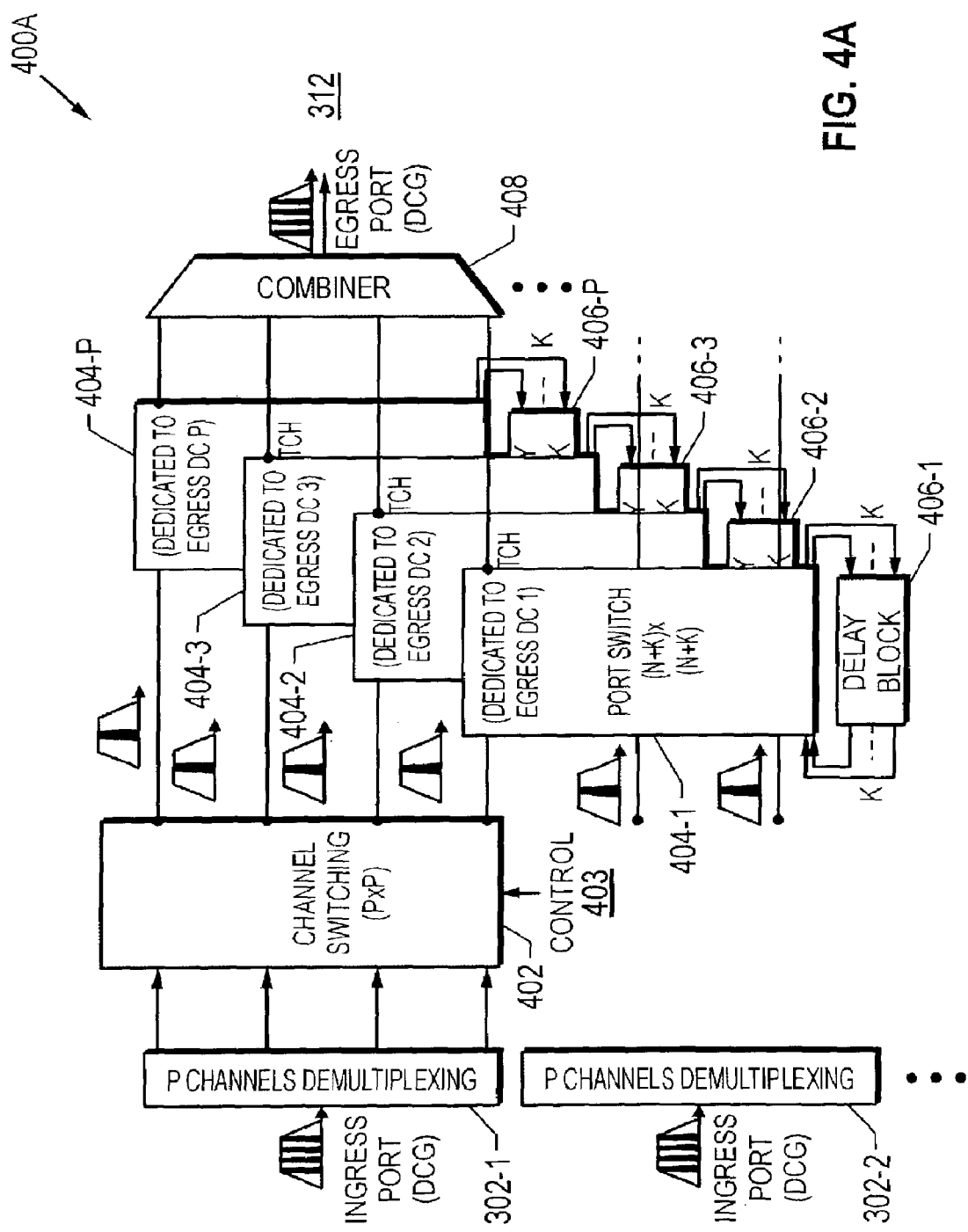

SCHEDULING SYSTEM AND METHOD FOR A BURST SWITCH

CROSS-REFERENCE TO RELATED APPLICATION(S)

This application discloses subject matter related to the subject matter disclosed in the following commonly owned co-pending patent application(s): (i) "Multiserver Scheduling System And Method For A Fast Switching Element," application Ser. No.: 10/059,641, filed Jan. 28, 2002, in the names of: Prasad Golla, Gerard Damm, John Blanton, Mei Yang, Dominique Verchere, Hakki Candan Cankaya, and Yijun Xiong; (ii) "Look-Up Table Arbitration System And Method For A Fast Switching Element," application Ser. No.: 10/075,176, filed Feb. 14, 2002, in the names of: Prasad Golla, Gerard Damm, John Blanton, and Dominique Verchere; (iii) "Binary Tree Arbitration System And Method," application Ser. No.: 10/109,423, filed Mar. 28, 2002, in the names of: Prasad Golla, Gerard Damm, Timucin Ozugur, John Blanton, and Dominique Verchere; and (iv) "Look-Ahead Contention Resolution Method For A Burst Switching Network, application Ser. No.: 10/328,354, Dec. 23, 2002 filed , in the name(s) of Farid Farahmand, John Blanton, and Dominique Verchere.

BACKGROUND OF THE INVENTION

1. Technical Field of the Invention

The present invention generally relates to scheduling techniques. More particularly, and not by way of any limitation, the present invention is directed to a scheduling system and method for a switching element operable with data bursts.

2. Description of Related Art

Scheduling is well-known as a resolution mechanism among a plurality of units contending for a common resource. For example, servers associated with input and output ports of a network element must first compete in order to establish appropriate traffic paths across a switching fabric before data can be transported between a selected input port and an output port. Since arbitration times can take a significant portion of a scheduling process, it is desirable to implement an efficient scheme where high throughput rates are required. Further, where available buffer space is limited or none at all, packet loss due to port congestion should be minimized as much as possible, especially where high quality services are to be provisioned. These concerns assume particular significance where data is aggregated at the input side of a switching system as a plurality of data bursts, or where scheduling functionality is distributed in disjoint entities (i.e., multi-level scheduling).

SUMMARY OF THE INVENTION

Accordingly, the present invention advantageously provides an innovative scheduling system and method operable with a burst switching element wherein control information is provided to the switching element via a separate Burst Header (e.g., as a separate control channel) that precedes data bursts on ingress data channels. In one embodiment, a series of scheduling determinations are made in a select order such that packet treatment (i.e., processing for transmission, buffering, or packet dropping) is optimized with respect to packet loss and available buffer space. In another embodiment, control information received in the Burst Headers is utilized to reserve output data channel bandwidth to future incoming data packets in a forward-looking scheduling mechanism.

BRIEF DESCRIPTION OF THE DRAWINGS

A more complete understanding of the present invention may be had by reference to the following Detailed Description when taken in conjunction with the accompanying drawings wherein:

FIG. 3A depicts a functional block diagram of an embodiment of the RBS system architecture wherein a plurality of delay buffers are associated with the ingress ports;

FIG. 4A depicts a functional block diagram of another embodiment of the RBS system architecture wherein a plurality of delay buffers are associated with the egress ports;

DETAILED DESCRIPTION OF THE DRAWINGS

Figure 1:
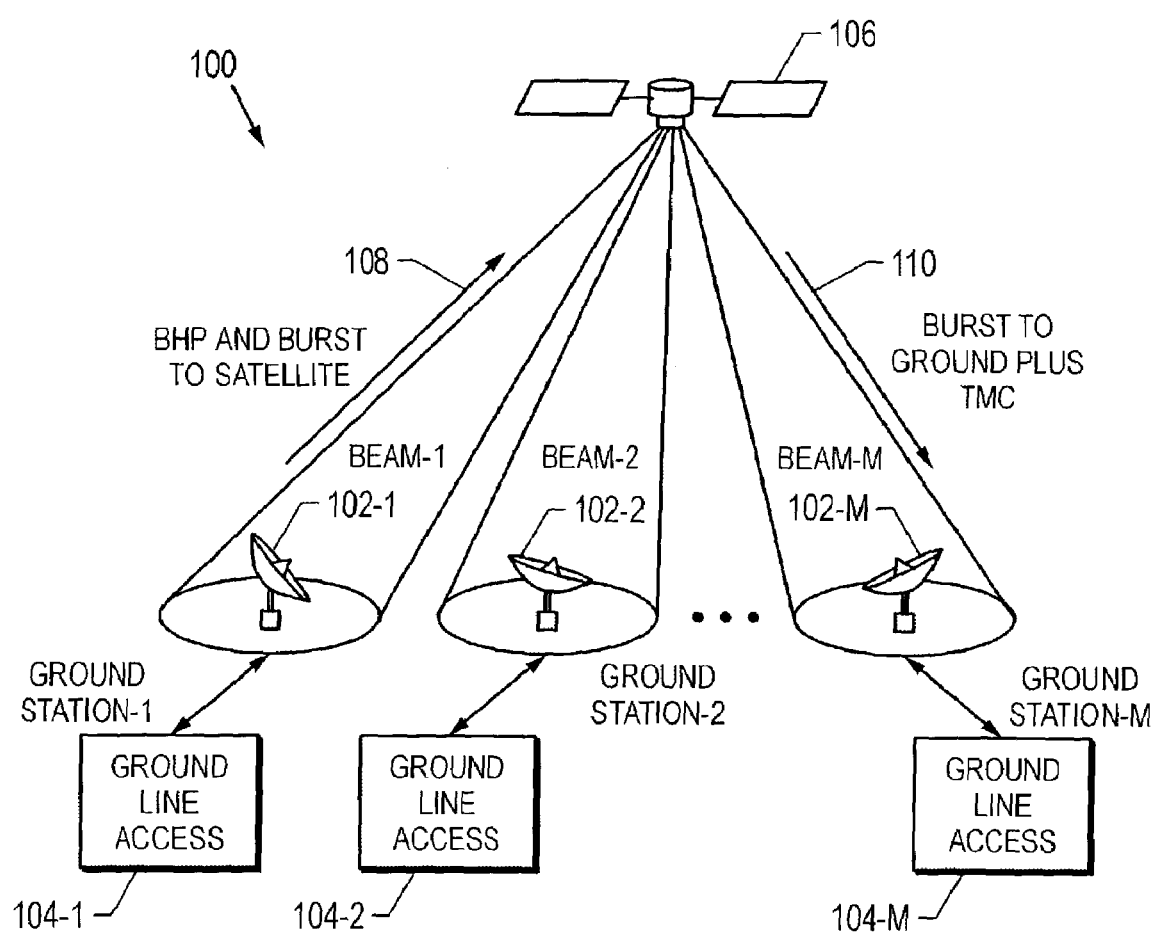
FIG. 1 depicts an exemplary satellite-based Radio Burst Switch (RBS) system wherein the teachings of the present invention may be employed.

In the drawings, like or similar elements are designated with identical reference numerals throughout the several views thereof, and the various elements depicted are not necessarily drawn to scale. Referring now to FIG. 1, depicted therein is an exemplary satellite-based Radio Burst Switch (RBS) system 100 wherein the teachings of the present invention may be advantageously employed for purposes of scheduling traffic. At the outset, it should be recognized that although the present invention's scheduling methodology will be particularly described in the context of the satellite-based RBS system 100, the teachings hereof can be practiced in other scheduling applications as well where packet loss requirements and/or buffering capacities are stringent. Accordingly, the term "switch element" will be used in the present application with a view to cover both RBS elements as well as terrestrial-based communications network elements employing scheduling techniques (e.g., switches, routers, et cetera).

Continuing to refer to FIG. 1, a plurality of ground stations 102-1 through 102-M are operably disposed in the RBS system 100 for communication via a relay satellite 106 that employs an embodiment of the scheduling methodology of the present invention as will be described in detail hereinbelow. Each ground station is provided with a ground line access mechanism that operates as a concentration point for the data packets received (i.e., as in an ingress node with respect to the RBS system) or transmitted (i.e., as in an egress node with respect to the RBS system) on the terrestrial network links coupled thereto. Reference numerals 104-1 through 104-M refer to M service access points associated with the corresponding ground stations for providing such ground line access.

The RBS system 100 is operable to switch data between a plurality of ports, e.g., M virtual full duplex ports provided with the relay satellite 100, using the scheduling scheme of the present invention, wherein each port represents a separate ground station. A separate beam covers each ground station, and each beam carries a number of frequency-multiplexed data channels (Data Channel Group or DCG). Packets received through ground links at a ground station's access point are aggregated into data bursts for transmission to the satellite via uplink beams, which include a Control Channel (CC) for carrying a Burst Header Packet (BHP) sent in advance of each data burst. Also, the CC's BHPs may be provided as in-band or out-of-band control information with respect to the data bursts. By way of illustration, reference numeral 108 refers to an exemplary uplink beam having the data channels and BHP channel transmitted by the ground station-1 102-1. An ingress beam-forming system (not shown) at the satellite 106 resolves the signals from the separate ground stations into different beams, and a demultiplexing system extracts the separate data channels from each beam.

In one exemplary implementation, the data bursts are preferably segmented into slots of equal size that correspond to the time slots of the relay satellite's switching matrix. Further, as will be described in additional detail hereinbelow, the scheduling system provided with the satellite element 106 preferably switches only during the guard band interval between the time slots. After an appropriate forwarding decision is implemented with respect to the incoming data packets as well as any buffered packets, a channel multiplexer aggregates the separate channels associated with an output port into a single signal. An egress beam-forming system then focuses the output port signals onto separate ground stations via downlink beams which include a Telemetry Channel (TMC) carrying slot synchronization information, in addition to the data burst channels. Reference numeral 110 refers to an exemplary downlink beam having the data burst channels and TMC signal transmitted to the ground station-M 102-M.

Figure 2:
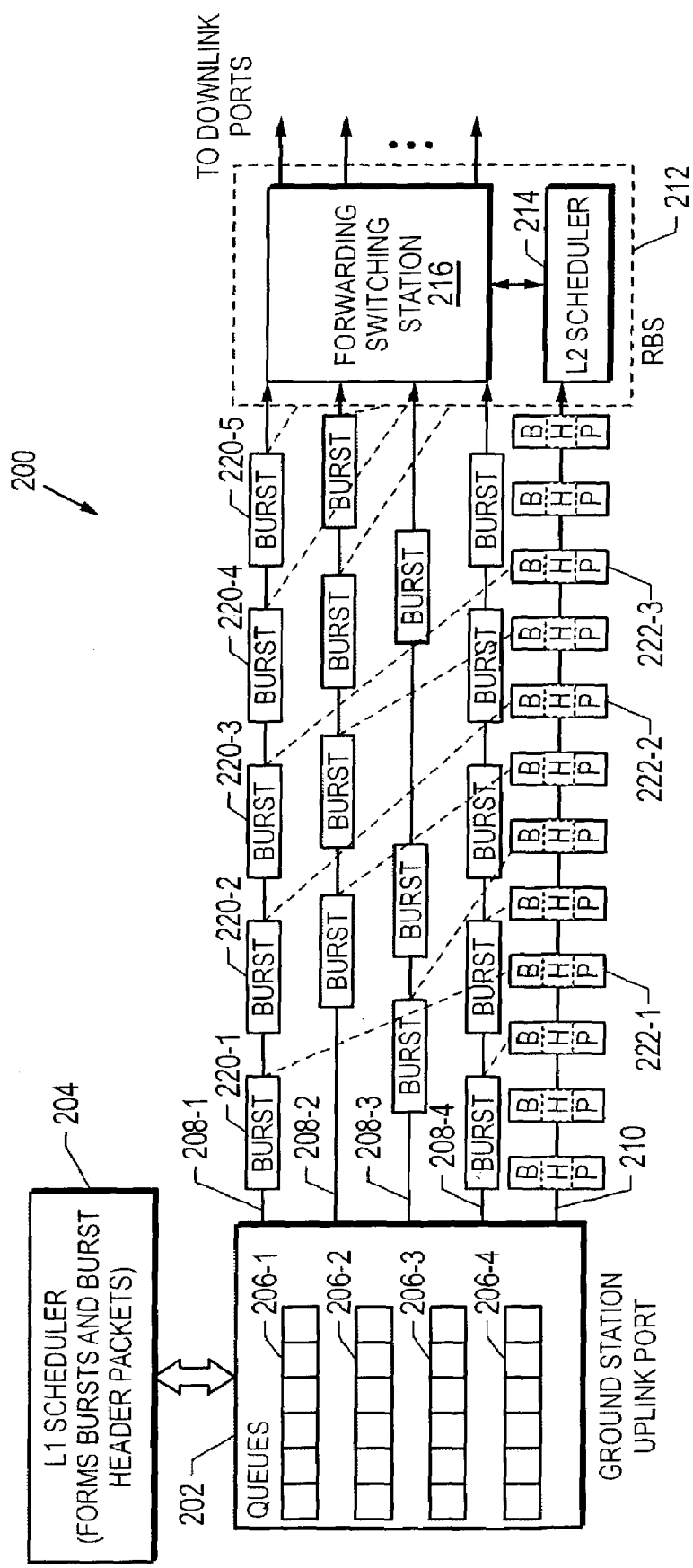
FIG. 2 depicts an exemplary channelized beaming scheme implemented in the RBS system shown in FIG. 1.

FIG. 2 depicts an exemplary channelized beaming scheme 200 implemented in the RBS system 100 described above. As pointed out, local ground stations are associated with respective service access points for concentrating ground lines and, accordingly, a Level-1 (L1) scheduler block 204 is provided to be operable with a ground station's uplink port 202 for forming data bursts (for example, incoming IP packets are aggregated into a "super packet," created on the basis of duration and/or length and having the same egress port and Class of Service (CoS) requirements) and corresponding BHPs. A queuing management system of the ground station is operable to enqueue the data bursts and BHPs into channel-specific queues for uplink transmission towards the satellite node of the PBS system. It should be appreciated that various known and novel queuing/scheduling techniques may be employed by the ground station for purposes of data enqueuing and local buffering. Reference numerals 206-1 to 206-4 refer to four exemplary data queues associated with four corresponding data channels 208-1 through 208-4. A Control Channel 210, either in-band or out-of-band, is operable to carry the BHPs associated with the data bursts ahead of their transmission on the data channels. For instance, data bursts 220-1 to 220-5 exemplify a plurality of data bursts transmitted on data channel 208-1. As illustrated in FIG. 2, BHP 222-1 is associated with data burst 220-1, BHP 222-2 is associated with data burst 220-2, and BHP 222-3 is associated with data burst 220-3. Likewise, the data bursts of the other data channels are associated with corresponding BHPs on Control Channel 210. As will be described below, each BHP is transmitted ahead of its data burst by a predetermined time offset, and includes necessary control information used in setting up the satellite's on-board burst switching apparatus 212. A Level-2 (L2) scheduler 214 is operable to receive the BHP information which, in response thereto, resolves the BHP requests for determining a forwarding decision. A forwarding switching station 216 is operable responsive to the output of the L2 scheduler 214 for configuring its switching matrix, whereby the outgoing data packets are directed to the downlink ports of the satellite.

Although buffer capacity that can be provided with the switching station of the RBS system is severely curtailed because of the tight satellite environment, a small amount of memory may nevertheless be available for purposes of supporting some delay in the packets that cannot be immediately processed for scheduling through the satellite node. This condition is particularly useful in providing services where guaranteed packet delivery is deemed important. The delay buffers may be associated with the switching system's ingress ports (for buffering input channels), egress ports (for buffering output channels), or both, depending on the architectural requirements, for implementing a plurality of delay paths within the system. Since the RBS system is operable to switch among N virtual full duplex ports (i.e., for switching, theoretically, between N ingress ports and N egress ports, each port supporting P data channels), a switching station capable of switching (N×P) channels will be necessary. Further, where K delay buffers are provided, each supporting a delay loop path with respect to the switching station, the switching matrix needs to be dimensioned (N×P+K) by (N×P+K), which may be partitioned in different ways based on the buffer architecture, among others. FIG. 3A depicts a functional block diagram of an embodiment of the RBS system architecture 300A wherein a delay buffer block 306 having a plurality of delay buffers is associated with the input data channels. A channel switch 304 is operable to receive incoming data burst packets (after beam-separated and demultiplexed) via a plurality of ingress ports 302-1 through 302-N, each having P data channels. In this configuration, a packet entering on a data channel of one ingress port is assigned to an available channel on a designated output port. If no channel is available on the output port, then the packet may be assigned to one of the delay buffers of the delay block 306. A plurality of port switches 308-1 to 308-P, each corresponding to an egress data channel group, are operably coupled to the channel switch 304.

Control signals 305, 309 provided by the forwarding decision block of the switching/scheduling system determine the configuration of the channel and port switches, respectively. The output of the port switches is provided to a multiplex combiner 310 that combines the P output channels of a particular egress port 312. As will be explained in detail hereinbelow, an elaborate packet forwarding methodology may be implemented for effectuating a scheduling scheme in accordance with the teachings of the present invention.

Figure 3B:
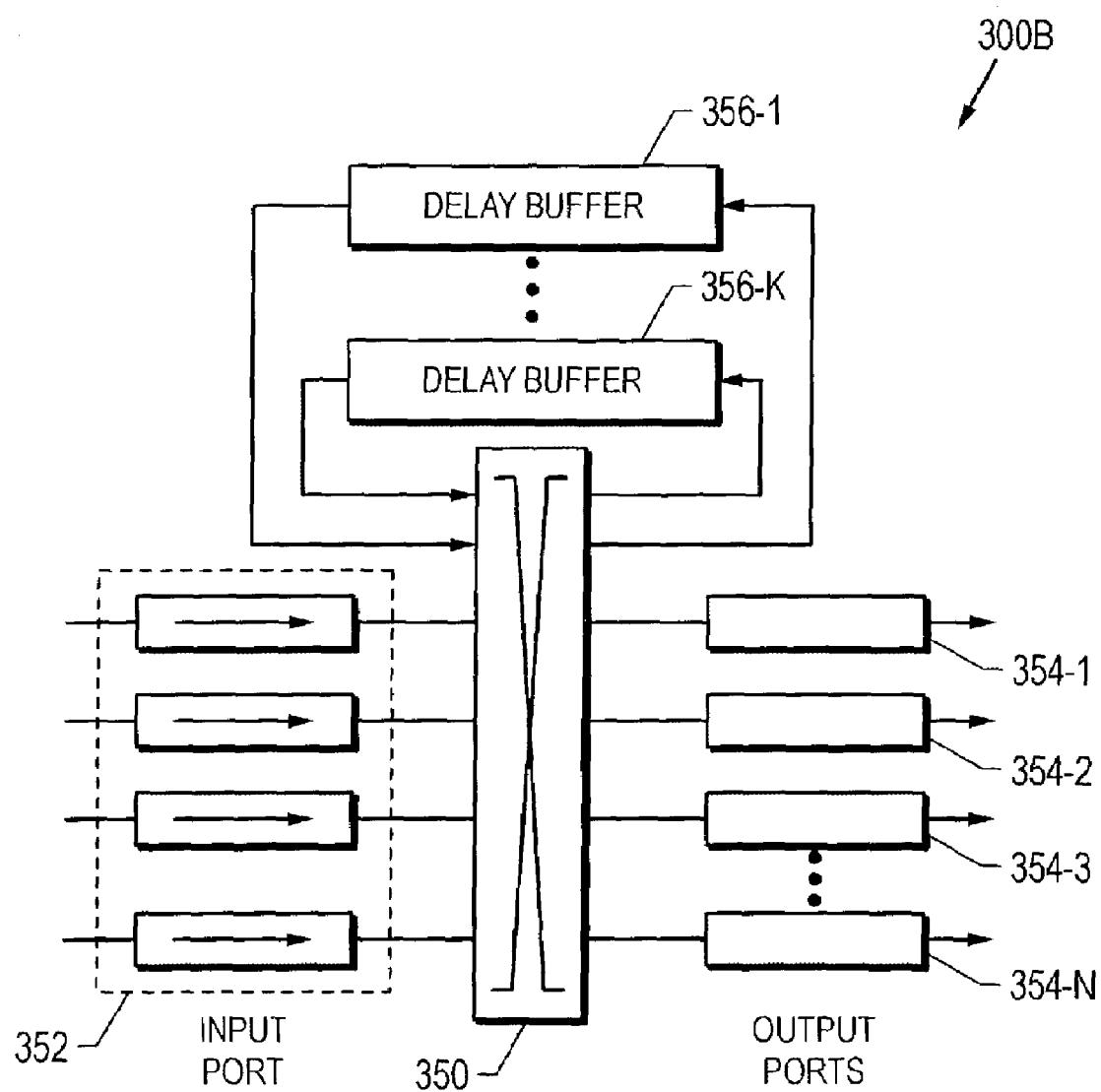
FIG. 3B depicts an architectural topology of the switching functionality associated with the RBS embodiment shown in FIG. 3A.

The functional architecture described above can be cast as a switching problem having an architectural topology 300B shown in FIG. 3B. The partitioned switching functionality of the RBS embodiment 300A is combined into a single switching block 350 that receives a plurality of data channels associated with each ingress port 352. Reference numerals 356-1 to 356-K refer to K delay buffers of the delay block 306 shown in FIG. 3A. Output ports 354-1 to 354-N exemplify the N egress ports of the RBS system.

FIG. 4A depicts a functional block diagram of another embodiment of the RBS system architecture 400A wherein the delay buffers are associated with the output ports. Again, N ingress ports 302-1 to 302-N provide the incoming data packets to a channel switch 402 that is coupled to P port switches 404-1 to 404-P. Each port switch is provided with a delay block having a set (K) of memory buffers. Reference numerals 406-1 to 406-P refer to the P delay blocks that correspond to P port switches. The outputs of the P port switches are combined on a port-by-port basis such that all output channels of a particular egress port 312 are frequency-multiplexed into a single signal.

Figure 4B:
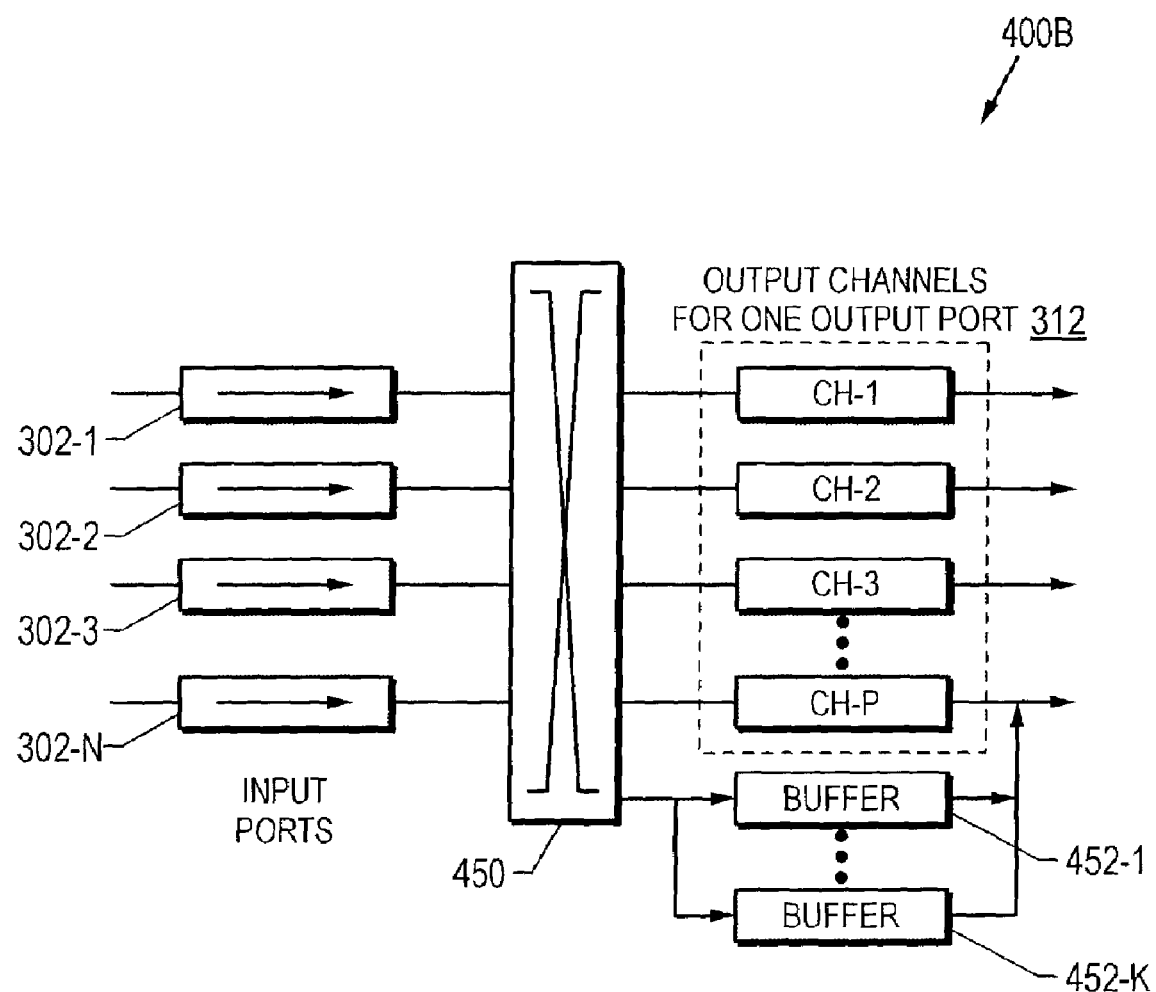
FIG. 4B depicts an architectural topology of the switching functionality associated with the RBS embodiment shown in FIG. 3B.

Similar to FIG. 3B, FIG. 4B depicts an architectural topology 400B associated with the RBS system embodiment 400A described above. A generic switching block 450, which exemplifies the separate channel and port switching structures shown in FIG. 4A, is operably coupled to the ingress ports 302-1 to 302-N for receiving demultiplexed data packets on individual input data channels. A plurality of delay buffers 452-1 to 452-K are associated with the P output channels of a single port, e.g., egress port 312. When a packet arrives at an input port, the scheduling mechanism determines the assigned egress port and searches for an available data channel associated therewith. If no channels or buffers are available, the packet may be dropped.

As alluded to hereinabove, the buffering capacity associated with the burst switching apparatus can be extremely limited. However, the packet dropping mechanism should be one such that not only a minimal amount is dropped but it should also be one that allows for judicious utilization of resources. Thus, in accordance with the teachings of the present invention, the scheduling methodology comprises a scheme for choosing which packet to drop among two or more candidates based on their position within the processing flow of the RBS system. Moreover, the methodology provides for randomizing the order of service to the multiple data channels arriving at the switch in order to avoid preferential treatment for one or more data flows.

Figure 5:
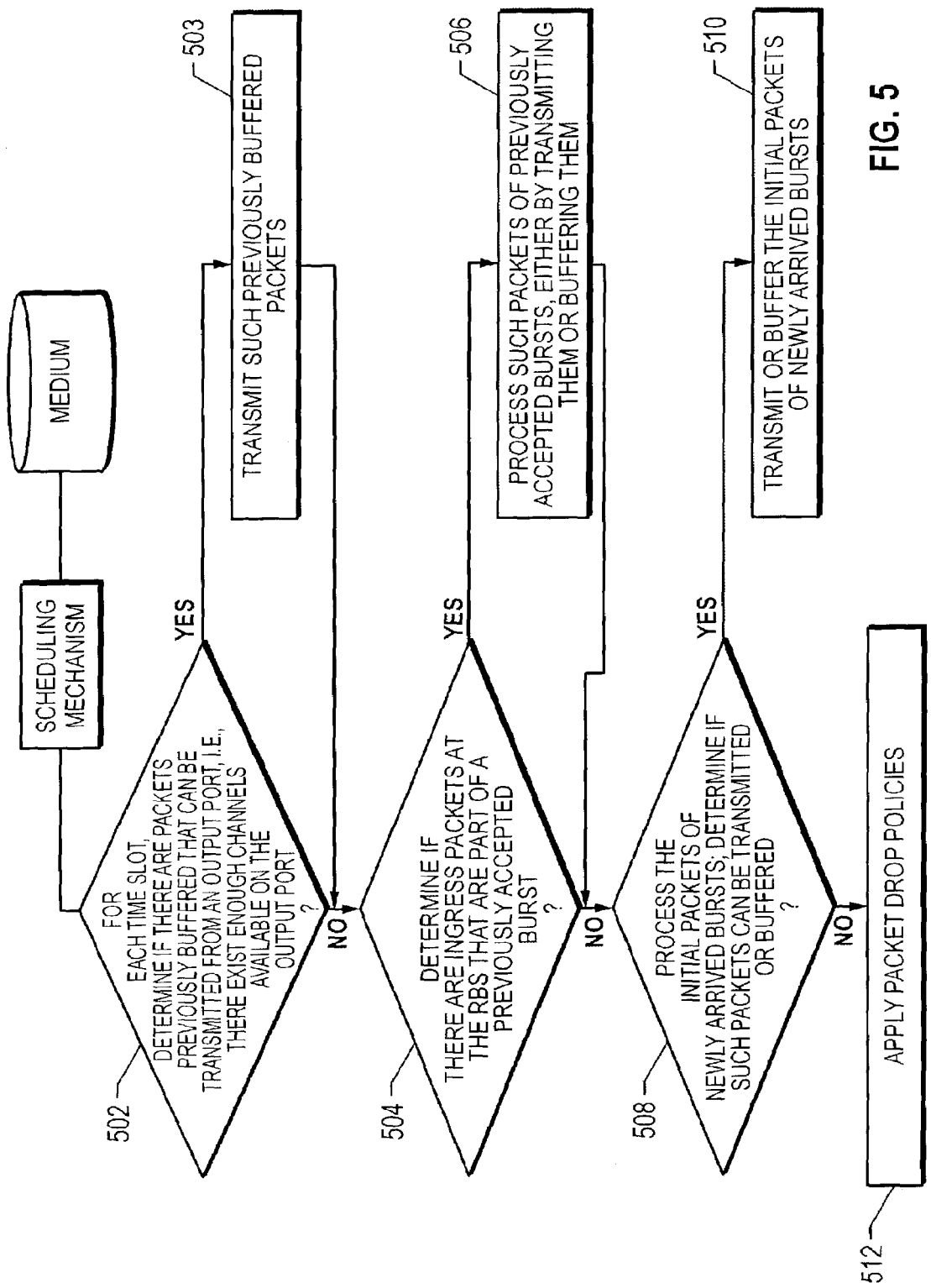
FIG. 5 is a flow chart of the various operations involved in an embodiment of the scheduling methodology provided in accordance with the teachings of the present invention.

FIG. 5 is a flow chart of the various operations involved in an embodiment of the scheduling methodology of the present invention which can be implemented with either of the architectural topologies described above, wherein at least a portion of the scheduling mechanism may comprise software/firmware instructions on a computer-accessible medium. For each time slot, a determination is made if there are packets previously buffered in the delay buffers that can be transmitted from an output port (block 502). In other words, the determination seeks to find if there are enough data channels available on the designated output ports that can be used for transmitting the previously buffered data packets. If so, such previously buffered packets are scheduled for transmission from the output ports before considering any other packets (block 503). Thereafter, another determination is made if there are ingress packets at the burst switching apparatus which are part of a previously accepted data burst (block 504). In the context of the present invention, a previously accepted burst is one for which one or more data packets have already been accepted by the RBS system, that is, the prior data packets have been scheduled for transmission or accepted for delay buffering, but not dropped. If so, such packets of previously accepted data bursts are processed before processing any of the newly arriving packets at the switch. Accordingly, these packets are scheduled for transmission immediately (in the current time slot), or buffered if necessary (block 506). Thereafter, yet another determination is made whether the initial packets of any newly arriving bursts can be transmitted or buffered (block 508). If so, such initial packets of the newly arrived data bursts are processed accordingly, depending upon the availability of output data channels on the destination egress ports and/or the availability of free delay buffers (block 510). Otherwise, a packet drop policy may then be applied with respect to the initial packets at the switch (block 512). In one exemplary application, if a packet of a particular data burst is dropped, all remaining packets associated with that data burst are also dropped, including any currently buffered packets.

In terms of implementation of the above-described scheduling mechanism, the switching apparatus may be required to write a new packet into a delay buffer while another packet is being transmitted from that buffer. This can be effectuated by servicing the buffers before servicing the input data channels. Accordingly, when an input data channel is processed, all delay buffers that were serviced in the same time slot (also known as slot cycle) are seen as empty and available. At the start of each slot cycle, therefore, all the delay buffers are examined to determine which ones have packets stored and available for routing to the output ports. Buffered packets that cannot be sent on output data channels may be held over to the next slot cycle. This process may be referred to as a "buffer kickback" scheme, and a ceiling on the number of cycles for which a buffered packet can be kicked back (i.e., held back) may be implemented based on design constraints. In one configuration, a numerical sequence may be established for all delay buffers in the switch, based on the buffer number and the port number, which can take the form of $S_{i,j}$, $S_{i,j+1}$, $S_{i,j+2}$, ..., $S_{i+1,j}$, $S_{i+1,j+1}$, $S_{i+1,j+2}$, ... where i is the port number (i→1, 2, ..., N) and j is the buffer number (j→1, 2, ..., K). Delay buffers may be serviced in a cyclic numerical order, first by buffer number and then by port number. To prevent starting each service cycle at the same point for a slot, a pointer mechanism may be implemented such that the service starting point is advanced in an unpredictable way during the scheduling process. The mechanism used to advance the pointer can be keyed to certain events driven by the incoming traffic.

As pointed out previously, the packets of existing data bursts are serviced after the delay buffers are serviced. For single-slot bursts this has no meaning, but for multi-slot bursts, slot number 2 and beyond of a data burst are serviced before any initial packets (i.e., slot number 1 packets) of a newly arrived burst. The intent is to preserve the accomplishment of scheduling previous slots of a multi-slot burst, since dropping a subsequent slot of the burst can result in discarding the slots that have already been transmitted to a ground station. If a slot cannot be allocated to an output data channel, then an attempt is made to store it one of the delay buffers associated with the port. On other hand, if the slot cannot be transmitted or stored, the whole data burst is dropped. Whenever a burst is dropped, the scheduler of the present invention searches through the delay buffers and discards any other slot packets associated with the dropped burst. In addition, the remaining packets of the burst that are yet to be received may be marked to be dropped as well.

To ensure that the processing of the channels does not consistently start with the same channel for each time slot (i.e., follow any fixed pattern), the service starting point may be randomized similar to the delay buffer service process described above. Pointers may be established with respect to the channel and port combination to start with, wherein the channel pointer may be advanced cyclically each time a packet is transmitted from a channel and the port pointer is advanced cyclically each time a new burst arrives at the switch. Again, the pointer advance mechanism may be keyed to the incoming traffic.

After the packets of existing bursts are processed, the scheduler processes packets of the newly arrived bursts. Whereas these are slot number 1 packets for multi-slot bursts as mentioned above, they comprise the sole packets for single-slot bursts. Other than that, their processing is similar to the scheduling mechanism set forth for the existing data bursts. Once again, the service starting point (channel and port combination) is randomized to prevent any fixed patterns.

The rationale for giving priority to subsequent slot packets may be illustrated as follows. When a burst comprises more than slot packet, it may be that the first packet must be dropped. Then, in order to conserve switch resources, the remaining packets of the burst are dropped. If the first packet is transmitted, it is important not to drop the subsequent packets of the burst, because this will result in loss of the previously transmitted packets also. Even in the absence of buffering (or, with limited buffering), it is possible to prevent loss of subsequent slot packets by the simple scheme of processing initial packets after all the previous bursts are processed.

As a further implementational variation, any statistical variation in traffic load on each channel and/or among a group of channels may be eliminated by requiring the switch's link partners (i.e., uplink and downlink ports) to use a burst initiating scheme that allows for generating a more deterministic traffic. Whereas such a scheme may require synchronization between the link partners, it imposes only a minimal collaboration among the various link partners since such synchronization is already required and no further collaboration is necessary to maintain the burst initiation timing.

Pseudocode relating to the above-described scheduling methodology, as applied in the two architectural topologies, is set forth below.

Case A: Delay Buffers Associated with Input Ports

```
Initially, all burst_status_{i,j} are set to EMPTY.
When a new burst arrives at channel_{i,j} its burst_status is set to
NEW.
  for each buffer i
    for each input port j
      if buffer_{i,j} is occupied
        if an output channel is available for the packet
          Switch the packet to the channel.
          Show the buffer as unoccupied.
        end if
      end if
    end for
  end for
  for each input channel i
    for each input port j
      if burst_status_{i,j} is OLD
        if an output channel is available for the packet
          Switch the packet to the channel.
        else
          if a buffer is available on port j
            Show the buffer as unavailable.
            Store the packet in the buffer.
          else
            Drop the packet.
            Delete from the buffers other packets of this burst.
          end if
        end if
      end if
    end for
  end for
  for each input channel i
    for each input port j
      if burst_status_{i,j} is NEW
        Cyclically advance the port start point.
        Set burst_status_{i,j} to OLD.
        if an output channel is available for the packet
          Switch the packet to the channel.
          Cyclically advance the channel start point.
        else
          if a buffer is available on port j
            Show the buffer as unavailable.
            Store the packet in the buffer.
          else
            Drop the packet.
            Set burst_status_{i,j} to EMPTY.
          end if
        end if
      end if
    end for
  end for
```

Case B: Delay Buffers Associated with Output Ports

```
Initially, all burst_status_{i,j} are set to EMPTY.
When a new burst arrives at channel_{i,j} its burst_status is set to
NEW.
  for each buffer i
    for each output channel j
      if buffer_{i,j} is occupied
        if an output channel is available for the packet
          Switch the packet to the channel.
          Show the buffer as unoccupied.
          Cyclically advance the buffer starting point.
        end if
      end if
    end for
  end for
  for each input channel i
    for each input port j
      if burst_status_{i,j} is OLD
        if an output channel is available for the packet
          Switch the packet to the channel.
        else
          if there are channels with available buffers
            Select an output channel k with the most
```

-continued

```
            available
                buffers.
                Select an available buffer from channel k.
                Show the buffer as unavailable.
                Store the packet in the buffer.
            else
                Drop the packet.
                Set burst_status_{i,j} to EMPTY.
                Delete from the buffers other packets of this
burst.
            end if
          end if
        end if
      end for
    end for
    for each input channel i
      for each input port j
        if burst_status_{i,j} is NEW
          Cyclically advance the port start point.
          if an output channel is available for the packet
            Switch the packet to the channel.
            Cyclically advance the channel start point.
          else
            if there are channels with available buffers
              Select an output channel k with the most
available
                buffers.
              Select an available buffer from channel k.
              Show the buffer as unavailable.
              Store the packet in the buffer.
            else
              Drop the packet.
              Set burst_status_{i,j} to EMPTY.
            end if
          end if
        end if
      end for
    end for
```

Favorable results have been obtained by way of experimental simulation involving the foregoing implementations of the present invention's scheduling methodology. Furthermore, although the scheduler processes the data channels in sequence (thereby sacrificing some performance that may be available in schemes incorporating parallel operations), it has been observed that adequate throughput and negligible packet loss are possible in the switch configurations tested via simulation. Additionally, in situations where the packet forwarding computations cannot be computed within one slot time (due to, for example, sequential processing of the channels and delay buffers), the scheduling methodology can still be implemented using multiple processors, each of which computes the packet forwarding solution for a separate time slot. This is possible because the BHPs precede the data bursts with enough time delay to allow the solution to be computed by the time the bursts actually arrive at the switch. Accordingly, such a scheme is operable to perform what may be referred to as "anticipatory" packet scheduling for effectuating forwarding decisions that are to be implemented at future time slots. The BHPs carried on the uplink Control Channels can be packed with appropriate information that can be utilized by the scheduler for "allocating" yet-to-arrive ingress data packets to output data channels and/or the delay buffers.

Figure 6:
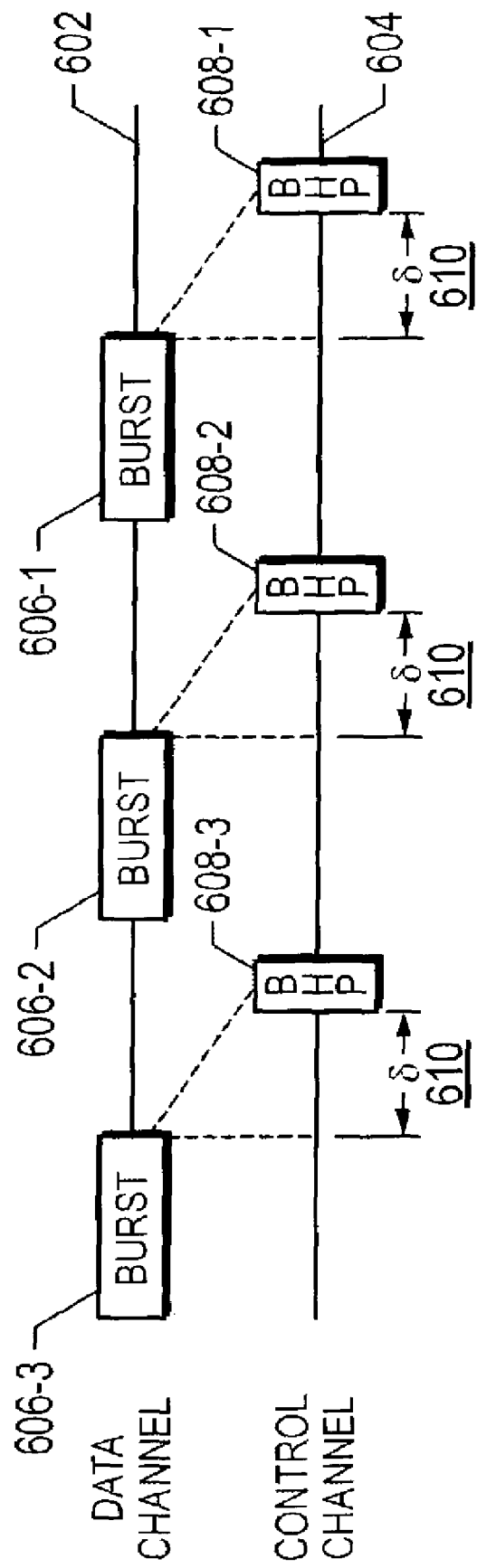
FIG. 6 depicts a graphical representation of a data channel and associated control channel, wherein the control channel includes control information used in effectuating an allocation-based scheduling mechanism for data bursts to be received at a switch element, e.g., the RBS system shown in FIG. 1.

Referring now to FIG. 6, depicted therein is a graphical representation of an exemplary data channel 602 and associated Control Channel 604, wherein a plurality of BHPs include control information used in effectuating a forward-looking scheduling mechanism alluded to in the foregoing. The data channel 602 is exemplified with three data bursts 606-1 through 606-3, each of which is preceded by a corresponding BHP. By way of illustration, BHP 608-1 precedes the data burst 606-1 associated therewith. Likewise, BHPs 608-2 and 608-3 are associated with data bursts 606-2 and 606-3, respectively. Each data burst is temporally separated from its BHP by a system-wide constant, e.g., delay (♦) 610, which can span a predetermined number of time slots, e.g., 4 slots, 5 slots, etc. As will be described in detail below, the forward-looking scheduler of the present invention is operable to implement an arbitration arrangement to "reserve" output data channels on a slot-by-slot basis using a memory-mapped channel scheme. In the context of the present invention, the BHPs can be packed with the following information:

Multicast Bit: This bit is set depending on whether the associated data burst is destined to one output port only (unicast) or towards multiple ports (multicast/broadcast). An "ON" multicast bit may be followed by a list of destination port numbers. Alternatively, a group of ports could be provided, wherein a group number is operable to indicate a pre-assigned list of output ports.

Group Bit: When this bit is set to "ON" condition, the list of destination numbers provided is treated as a single group, not as a collection of individual ports. It should be appreciated that referring to group entities rather than individual port numbers may reduce the size of the BHP considerably.

Destination Field Number(s): These numbers identify a list of ports or a group of ports the burst is destined to in case the multicast bit is set. If the multicast bit is not set, then the burst is identified for unicast service. When the multicast bit is set but the group bit is not set, then the destination port numbers are individually listed. If both the group and multicast bits are set, then the list of destination numbers refers to groups of ports.

Offset: This field indicates the time in time slot (TS) increments after which the burst will arrive at the forwarding switch. The number of bits in the offset field will depend on the maximum allowable time slots between the BHP's arrival and the arrival of the data burst. As pointed out before, this offset may be provided as a system-wide constant, (♦); but it may also be variable. If X time slots are necessary for the scheduler to perform forward-looking channel allocations, setting of the switching matrices, etc., then a delay of X time slots between the BHPs and associated data bursts will be needed. If everything is properly slotted and synchronized, this delay may be treated as a constant (i.e., exactly X time slots between each BHP-burst pair). Also, as will be described below, the scheduler needs to be implemented in a pipeline organization having X instances, each scheduler instance executing independently for finding a matching solution (which pre-allocates incoming data packets to memory-mapped outgoing data channels and/or delay buffers) for its corresponding time slot.

Burst Length: This field provides the burst length as the number of time slots a data burst occupies. In general, a data burst occupies at least one time slot. Appropriate padding may be provided where slot boundaries and burst boundaries are not aligned.

Additionally, depending on the Control Channel organization (i.e., merged Control Channels), the input channel and the input port information could also be included in the BHP fields.

Figure 7:
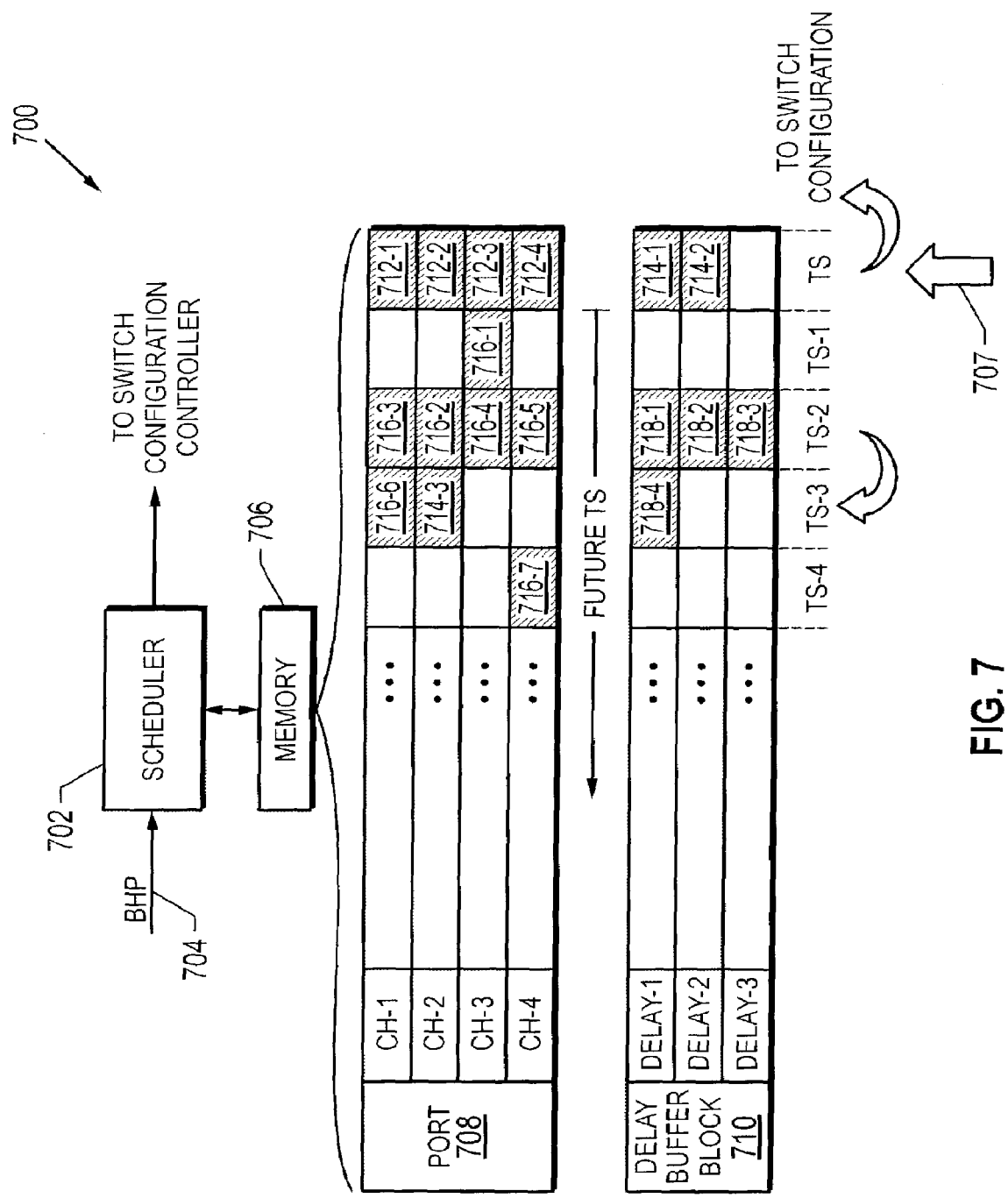
FIG. 7 depicts a memory-mapped channel reservation scheme used for scheduling incoming data bursts to be received by the switch element.

A forward-looking scheduling mechanism for channel reservation can now be described using the BHP information set forth above. Referring to FIG. 7, depicted therein is an exemplary memory-mapped channel reservation scheme 700 used for scheduling future data bursts to be received in a switching element. A scheduler 702 is operable to receive the BHPs via a Control Channel 704, which BHPs include control information such as delay ♦, burst length, multicast indicators, et cetera. A memory block 706 associated with scheduler 702 is operable to contain a port-associated mapping wherein a plurality of memory locations are associated with output data channels and delay buffers on a time slot basis. By way of illustration, a single port 708 having four output data channels (CH-1 through CH-4) and a delay buffer block 710 having three buffers (DELAY-1 through DELAY-3) are memory-mapped from the current time slot (TS) through a plurality of future time slots (TS-1, TS-2, et cetera). A slot pointer 707 points to the data packet assignment that is current for each time slot. The assignment map at TS (i.e., the current slot) is forwarded to the switch configuration controller (not shown) for setting the packet switching/forwarding paths for the current slot cycle.

Forward-looking packet assignment for channel reservation is accomplished based on the BHP information. As the incoming BHPs continuously provide information regarding the follow-on data bursts on the ingress data channels, a channel allocation mechanism (which can be based on arbitration, e.g., a round-robin arbitration (RRA) mechanism, or a simple counter-based mechanism) resolves the BHP requests such that the slot-mapped memory locations contain indications of which future packets are assigned to which output data channels and/or delay buffers on a per-slot basis. For instance, reference numerals 712-1 through 712-4 refer to the indications associated with four data packets that are scheduled for transmission on the output port's four channels, CH-1 through CH-4, in the current TS. By way of example, indication 712-1 may be associated with a packet on incoming port x1, data channel y1; indication 712-2 with a packet on incoming port x2, data channel y1; indication 712-3 with a packet on incoming port x1, data channel y2; and indication 712-4 with a packet on incoming port x3, data channel y3. Likewise, reference numerals 714-1 and 714-2 refer to the indications associated with two data packets that are to be buffered in DELAY-1 and DELAY-2, respectively, in the current TS. It should be apparent that these indications may simply comprise ordered pairs of {port; channel} associated with packets that have been selected based on a scheduling/arbitration mechanism.

Continuing to refer to FIG. 7, reference numeral 716-1 refers to an indication that an incoming data packet associated with a {port; channel} pair is to be scheduled for transmission on the output port's CH-4 in the next slot (i.e., TS-1). In similar manner, reference numerals 716-2 to 716-5 refer to the indications (or, "channel reservations") of future data packets to be scheduled in TS-2 slot (i.e., two slots behind the current slot); reference numerals 716-6 and 714-3 refer to the future channel reservations in TS-3 slot; and reference numeral 716-7 refers to the channel reservation by a packet in TS-4 slot. The delay buffer block is likewise slot-mapped to indicate which future data packets may be buffered in which buffers. Reference numerals 718-1 to 718-3 refer to the indications associated with three packets (as identified by their {port; channel} combinations) that are to be buffered in TS-2 slot. Similarly, reference numeral 718-4 refers to the indication of a future packet to be buffered in TS-3 slot.

It should be recognized that a buffer kickback mechanism may also be implemented in the forward-looking scheduling scheme set forth above. For example, an arbitration associated with TS-2 may result in a determination to hold a buffer reservation indication over for another time slot, as all the TS-2 memory locations associated with the channels for the particular output port are full. Such a buffer kickback is exemplified by an arrow from TS-2 to TS-3 in the buffer mapping. A variety of rules may be implemented with respect to the kickback scheme. For example, kickback may not be possible when the number of times a packet indication is kicked back reaches a predetermined maximum. In this case, the affected packet indication is "dropped," that is, the packet will not be able to obtain an output data channel or a buffer when it actually arrives at the switch.

Figure 8:
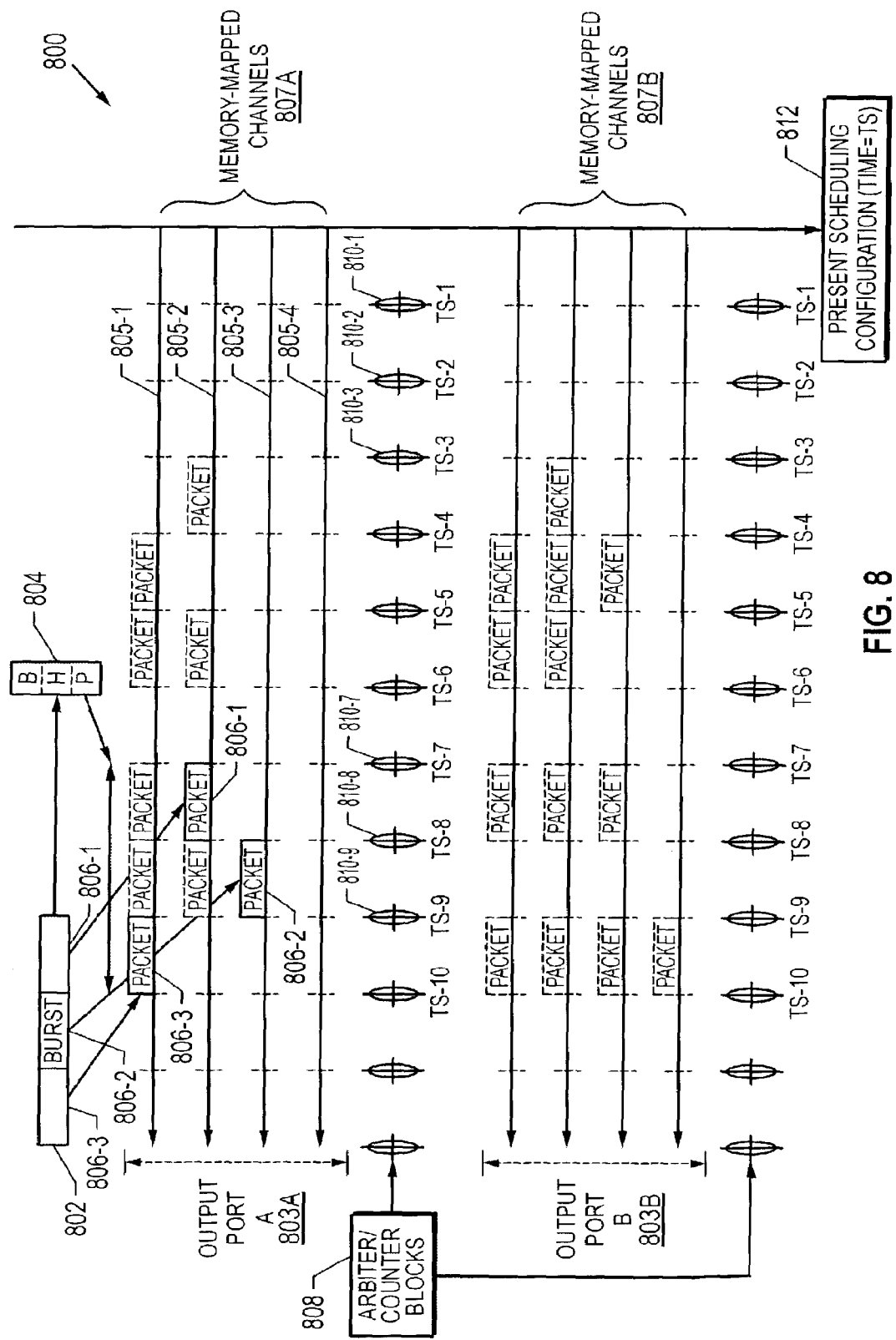
FIG. 8 depicts an exemplary scheduling operation using the memory-mapped channel reservation scheme provided in accordance with the teachings of the present invention.

In terms of an exemplary implementation, FIG. 8 depicts a 2-output port, 4-channel forward-looking allocation scheme 800 of the present invention. Data channels of output port A 803A and output port B 803B are mapped to respective memory locations that are slot-mapped as described above. By way of illustration, reference numerals 805-1 through 805-4 refer to the four data channels of the output port A 803A provided as a memory-mapped portion 807A. Likewise, reference numeral 807B refers to the memory-mapped portion associated with the output port B 803B. Reference numeral 812 refers to the current slot packet assignment (i.e., at TS) that is forwarded for configuring the switching path matrix of the network element.

Each time slot is associated with an arbiter/counter that allocates packet indications, one channel at a time, based on the look-ahead BHP requests received by the scheduler. The number of arbiters/counters needed is determined, at least in part, by the offset between the BHPs and the associated data bursts because of systemwide constraints. If the maximum and minimum offset values are $\blacklozenge_{max}$ and $\blacklozenge_{min}$, respectively, the number of arbiters/counters would be approximately $\blacklozenge_{max} - \blacklozenge_{min}$. However, in terms of memory allocation, it is preferred that registers to store the scheduling allocation for all the $\blacklozenge_{max}$ slots be present.

Continuing to refer to FIG. 8, reference numeral 808 refers to a block of arbiters/counters that are associated with each port's slot-mapped memory allocation portion wherein each time slot is provided with an arbiter/counter. For instance, 12 arbiter/counters are illustrated for each of the output ports; arbiter/counter 810-1 is associated with TS-1 (i.e., one slot behind the current slot), arbiter/counter 810-2 is associated with TS-2 (i.e., two slots behind the current slot), and so on. Each arbiter/counter operates to fill the memory-mapped channels with packet indications, on a slot-by-slot basis, based on any known or heretofore unknown arbitration mechanism or simple counting. For example, when a BHP 804 corresponding to a 3-packet data burst 802 is transmitted to the switching element, arbiter/counter 810-8 fills channel 2 of output port A 803A with the packet indication associated with packet 806-1 for the TS-8 slot. Likewise, indications for subsequent packets 806-2 and 806-3 are filled in TS-9 and TS-10 slots, using corresponding arbiters/counters (hereinafter, collectively "arbiters").

An exemplary packet drop policy in the context of the forward-looking scheduling allocation mechanism is set forth below. Any BHP that indicates an arrival of a burst longer than ♦ slots is discarded and, accordingly, the burst will be ignored when it is sent to the switch. In view of the buffer kickback scheme described above, a packet indication will be dropped when it cannot be kicked back by a slot. Apart from the limitation on the number of kickbacks allowed, kickback may also be limited by the condition where, at any given time slot, the maximum available delay loops have been exhausted. Associated with each time slot there may be a register that signifies how many packets (i.e., their indications) are destined to be sent to the delay loops in that particular time slot.

Also, when a packet indication is "dropped" for whatever reason, indications associated with the whole burst will also be dropped, much like the condition where actual packets are dropped. If a Quality of Service (QoS) program is implemented whereby the traffic is assigned multiple priorities, high priority packets can preempt low priority packets. In such a situation, an entire low priority burst may have to be preempted as well.

Figure 9:
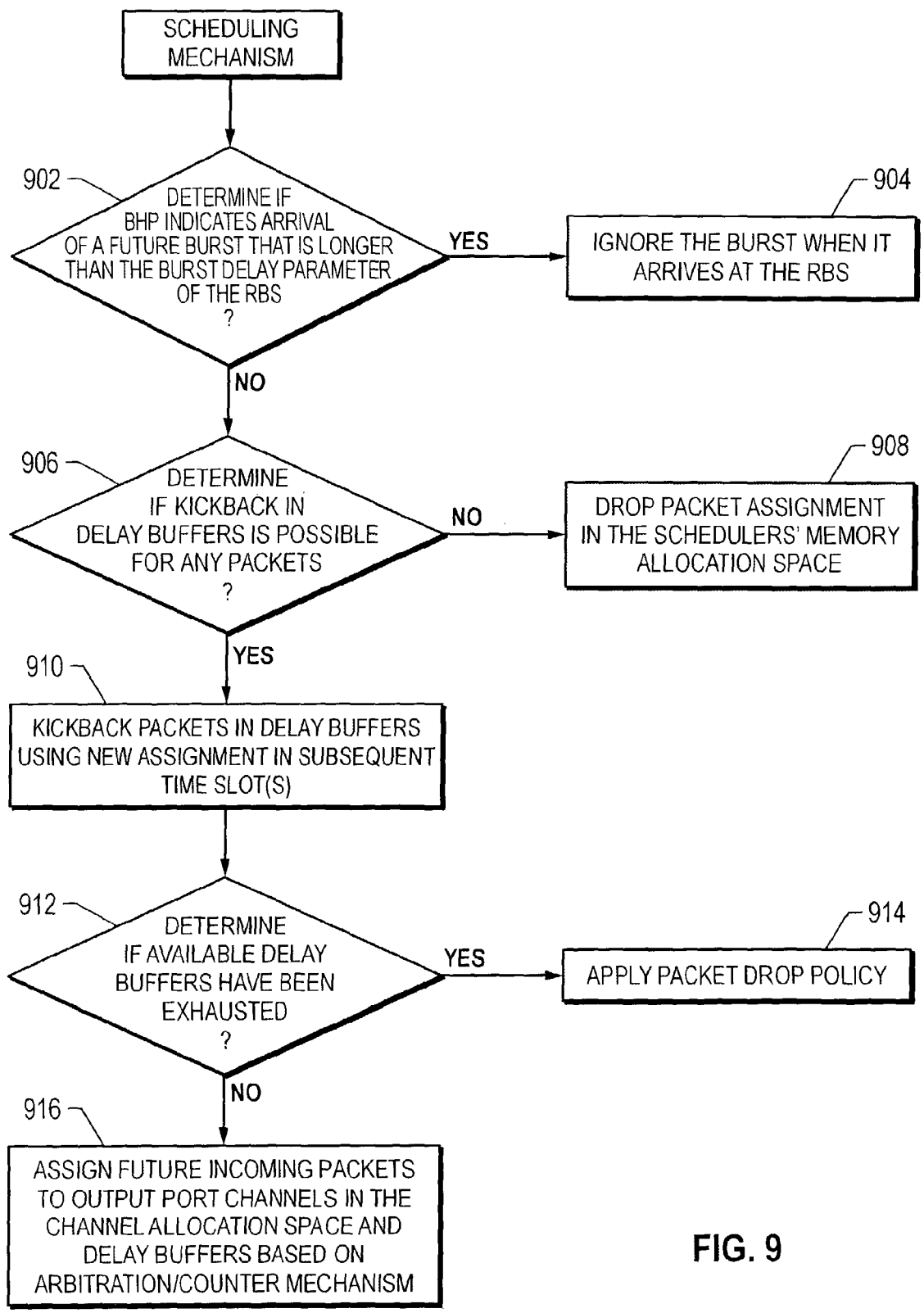
FIG. 9 is a flow chart of the various operations involved in another embodiment of the scheduling methodology provided in accordance with the teachings of the present invention.

FIG. 9 is a flow chart of the various operations involved in an exemplary forward-looking scheduler mechanism of the present invention. A determination is made if a BHP indicates arrival of a future burst that is longer than the system's burst delay parameter (block 902). If so, that burst is ignored for purposes of scheduling an output channel (block 904). Another determination is made if kickback in delay buffers is possible for any packet (i.e., their indications) (block 906). If kickback is not possible, packet indication assignment is dropped in the scheduler's memory allocation space (block 908). On the other hand, if kickback is allowed, packet indications may be mapped to different assignments in subsequent time slots (block 910). If all available delay buffers have been exhausted and no data channel assignment is possible (block 912), a packet drop policy may be applied as described above (block 914). Otherwise, packet indications regarding future packets are assigned to output port channels based on an arbitration/counter mechanism, on a slot-by-slot basis (block 916). Where per-slot arbitration is utilized for resolving the BHP requests, a variety of schemes may be implemented including, e.g., Round-Robin Arbitration (RRA), Binary Tree Arbitration (BTA), Prioritized BTA, Look-Up Table Arbitration, and other modifications described in the following commonly owned co-pending patent application(s): (i) "Multiserver Scheduling System And Method For A Fast Switching Element," application Ser. No. 10/059,641, filed Jan. 28, 2002, in the names of: Prasad Golla, Gerard Damm, John Blanton, Mei Yang, Dominique Verchere, Hakki Candan Cankaya, and Yijun Xiong; (ii) "Look-Up Table Arbitration System And Method For A Fast Switching Element," application Ser. No. 10/075,176, filed Feb. 14, 2002, in the names of: Prasad Golla, Gerard Damm, John Blanton, and Dominique Verchere; and (iii) "Binary Tree Arbitration System And Method," application Ser. No. 10/109,423, filed Mar. 28, 2002, in the names of: Prasad Golla, Gerard Damm, Timucin Ozugur, John Blanton, and Dominique Verchere, which is (are) hereby incorporated by reference.

Implementational aspects of an exemplary forward-looking scheduler mechanism of the present invention are set forth as below. First, output data channels are mapped to a memory block (i.e., a mapped-memory structure) associated with the scheduler, wherein the memory can comprise any conventional type, e.g., non-volatile RAM, EPROM, Flash memory, and the like. Each data channel is mapped to a plurality of memory locations that are organized into a number of sections corresponding to a predetermined number of future time slots (i.e., the "look-ahead horizon"). The memory-mapped channels are also organized on per-port basis. A corresponding number of "arbiters" (including mechanisms that involve request-grant-accept (RGA) or request-grant (RG) arbitrations as well as mechanisms employing simple counting) are provisioned such that each future time slot of an output port is associated with an arbiter that computes or otherwise determines assignment of future data packets with respect to that particular slot/port combination. In other words, a determination is made with respect to each future time slot, based on the control information received via the BHPs, as to which future data packets can be sent on which output data channels. As explained in detail hereinabove, packet indications relating to the allocated future data packets are stored in appropriate memory locations on per-channel and per-slot basis to provide a slot-by-slot channel assignment map. As the current time slot of the switching matrix is incremented, a corresponding channel assignment map is forwarded to the matrix for transmitting data packets on output data channels in accordance with the map. In a further variation, delay buffer mapping may also be included as described above.

Figure 10:
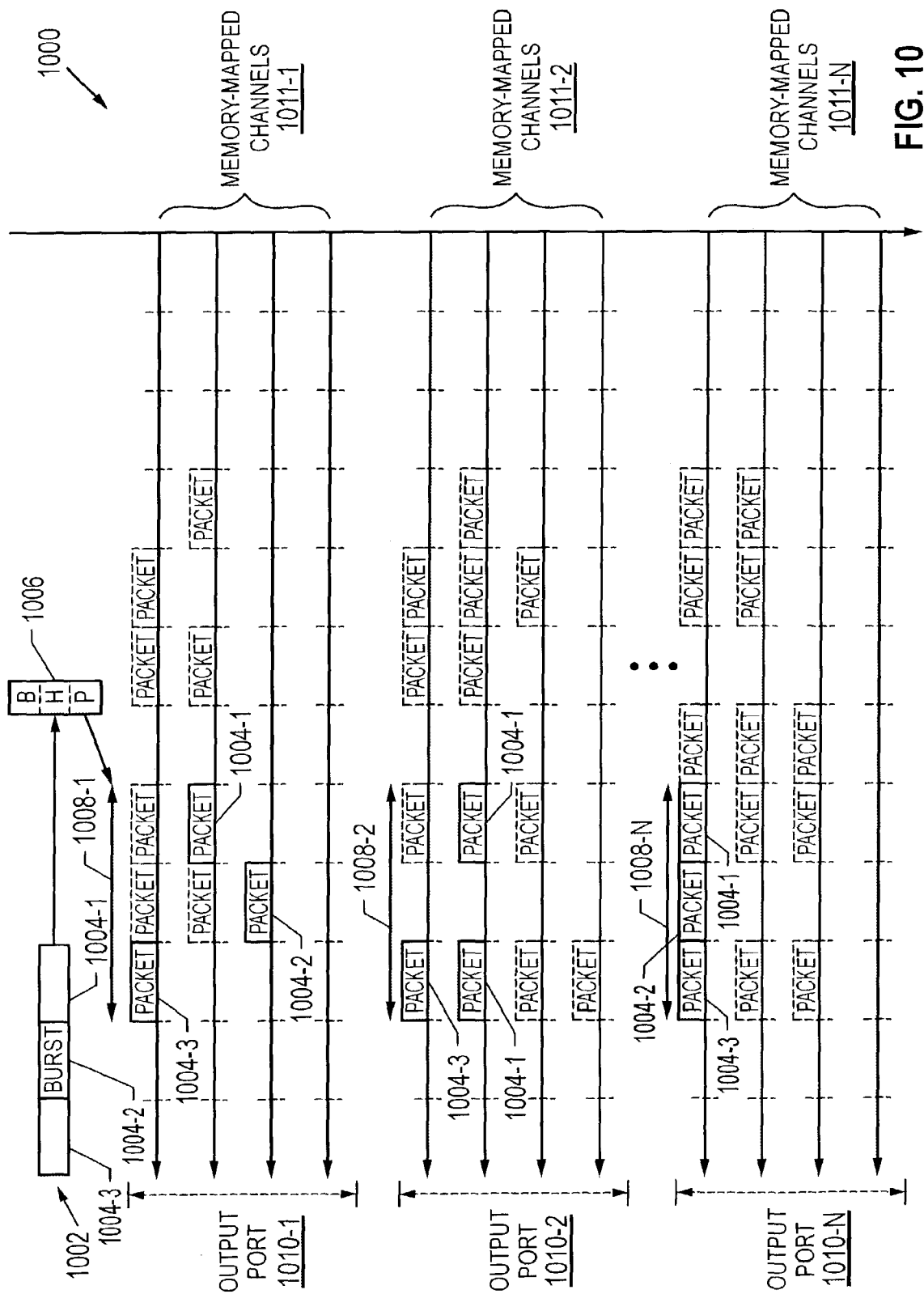
FIG. 10 depicts an exemplary multicast scheduling operation using the memory-mapped channel reservation scheme provided in accordance with the teachings of the present invention.

The forward-looking scheduling mechanism of the present invention can be practiced with multicast service as well. FIG. 10 depicts an exemplary channel-reservation-based multicast scheduling scheme 1000 provided in accordance with the teachings of the present invention. Based on the control information (i.e., multicast bit, group bit and destination port list information) provided in a BHP 1006 corresponding to a 3-packet data burst 1002, the packet indications relating to the three packets are assigned to a 3-slot window associated with each destination port's memory map. Reference numerals 1004-1 to 1004-3 refer to the three data packets of the burst 1002, whose indications are assigned slot-by-slot with respect to a plurality of output ports 1010-1 to 1010-N in 3-slot windows 1008-1 to 1008-N associated therewith. Data channels of the output ports are memory-mapped as described hereinabove. Accordingly, slot-based memory map channels 1011-1 to 1011-N correspond to the N output ports, wherein the package indications can be assigned based on the BHP requests. In a multicast service, the package indications are allocated on a per-port basis and, as a consequence, the package indication assignments may not be identical across the ports, as illustrated in this FIG. Moreover, the package indications for a destination port may be partially buffered for the slot window associated therewith.

Based on the foregoing, those skilled in the art should appreciate that the present invention provides an innovative scheduling mechanism operable with a burst switching environment wherein stringent buffering capacity and packet drop conditions are typically encountered. By processing data packets in accordance with the scheduling principles set forth in this patent application, not only are the switch resources judiciously conserved but the throughput is maintained with minimal packet loss as well. In a further aspect, the forward-looking scheduling mechanism of the present invention provides a more advanced implementation that determines packet forwarding strategies based on the advance control information received on control channels.

It is believed that the operation and construction of the present invention will be apparent from the Detailed Description set forth hereinabove. While the exemplary embodiments of the invention shown and described have been characterized as being preferred, it should be readily understood that various changes and modifications could be made therein without departing from the scope of the present invention as set forth in the following claims.

What is claimed is:

1. A scheduling method for use with a switch element operating to switch at least one input data channel of an input port to an output port, said at least one input data channel including data bursts of a plurality of packets each, comprising the steps:

for each time slot associated with said switch element,
    determining whether a buffer structure provided with said switch element contains previously received data packets that can be transmitted from said output port on an output data channel;

if so, forwarding said previously received data packets for transmission on said output data channel;

determining whether a currently received data packet on said at least one input data channel is part of a data burst previously accepted by said switch element for transmission;

if so, processing said currently received data packet on said at least one input data channel;

determining whether a currently received initial data packet of a new data burst on said at least one input data channel can be processed for scheduling by said switch element; and if so, processing said currently received initial data packet for scheduling by said switch element.

2. The scheduling method for use with a switch element as set forth in claim 1, further comprising the step of applying a packet drop policy with respect to at least one of said currently received data packet and said currently received initial data packet if said switch element is unable to process said data packets.

3. The scheduling method for use with a switch element as set forth in claim 1, wherein said step of processing said currently received data packet on said at least one input data channel comprises forwarding said currently received data packet for transmission on an output data channel associated with said output port.

4. The scheduling method for use with a switch element as set forth in claim 1, wherein said step of processing said currently received data packet on said at least one input data channel comprises storing said currently received data packet in said buffer structure.

5. The scheduling method for use with a switch element as set forth in claim 4, wherein said buffer structure is associated with said input port.

6. The scheduling method for use with a switch element as set forth in claim 4, wherein said buffer structure is associated with said output port.

7. The scheduling method for use with a switch element as set forth in claim 1, wherein said step of processing said currently received initial data packet of a new data burst on said at least one input data channel comprises forwarding said currently received initial data packet for transmission on an output data channel associated with said output port.

8. The scheduling method for use with a switch element as set forth in claim 1, wherein said step of processing said currently received initial data packet of a new data burst on said at least one input data channel comprises storing said currently received initial data packet in said buffer structure.

9. The scheduling method for use with a switch element as set forth in claim 8, wherein said buffer structure is associated with at least one of said input port and said output port.

10. The scheduling method for use with a switch element as set forth in claim 1, wherein said previously received data packets contained in said buffer structure are forwarded based on a numerical sequential order established for a plurality of buffer elements that form said buffer structure.

11. A scheduling system for use with a switch element operating to switch at least one input data channel of an input port to an output port, said at least one input data channel including data bursts of a plurality of packets each, said system comprising:

means for forwarding data packets that are stored in a buffer structure provided with said switch element upon determining that there exists an output data channel available on said output port for transmitting said data packets;

means for processing a currently received data packet on said at least one input data channel upon determining that said currently received data packet is part of a data burst previously accepted by said switch element for processing; and means for processing a currently received initial data packet of a new data burst upon determining that said currently received initial data packet of a new data burst can be processed for scheduling by said switch element.

12. The scheduling system for use with a switch element as set forth in claim 11, further including means for applying a packet drop policy with respect to at least one of said currently received data packet and said currently received initial data packet if said switch element is unable to process said data packets.

13. The scheduling system for use with a switch element as set forth in claim 11, wherein said means for processing said currently received data packet on said at least one input data channel comprises means for forwarding said currently received data packet for transmission on an output data channel associated with said output port.

14. The scheduling system for use with a switch element as set forth in claim 11, wherein said means for processing said currently received data packet on said at least one input data channel comprises means for determining whether said currently received data packet needs to be stored in said buffer structure.

15. The scheduling system for use with a switch element as set forth in claim 14, wherein said buffer structure is associated with said input port.

16. The scheduling system for use with a switch element as set forth in claim 14, wherein said buffer structure is associated with said output port.

17. The scheduling system for use with a switch element as set forth in claim 11, wherein said means for processing said currently received initial data packet of a new data burst comprises means for forwarding said currently received initial data packet for transmission on an output data channel associated with said output port.

18. The scheduling system for use with a switch element as set forth in claim 11, wherein said means for processing said currently received initial data packet of a new data burst comprises means for determining whether said currently received initial data packet needs to be stored in said buffer structure.

19. The scheduling system for use with a switch element as set forth in claim 18, wherein said buffer structure is associated with at least one of said input port and said output port.

20. The scheduling system for use with a switch element as set forth in claim 11, wherein said data packets stored in said buffer structure are forwarded based on a numerical sequential order established for a plurality of buffer elements that form said buffer structure.

* * * * *